United States Patent Office 3,446,742
Patented May 27, 1969

3,446,742
COAGULANT FOR CLARIFYING TURBID
AQUEOUS FLUIDS
Oliver M. Bacon, Cincinnati, Ohio, assignor to The Hunnewell Soap Company, Cincinnati, Ohio, a corporation of Ohio
No Drawing. Filed Sept. 20, 1965, Ser. No. 488,729
Int. Cl. C02b 1/20
U.S. Cl. 252—175                 18 Claims This invention relates to the treatment of turbid aqueous fluids and to a novel composition for effecting such treatment. More particularly the present invention relates to a novel coagulant composition which has unusual properties in effecting the removal of turbidity-forming contaminants from water or aqueous solutions. The invention is thus concerned with the clarification of turbid aqueous liquids and with the provision of a novel composition of matter which is highly efficient as a coagulant in effecting such clarification. The invention further relates to compositions which have been discovered to possess excellent flocculating characteristics in the treatment of water by a coagulation process.

Turbidity in water or aqueous solutions is encountered frequently and presents a serious problem. Water for municipal or industrial use, whether derived from rivers or other surface waters or from wells, is usually contaminated with silt or other finely divided particles of matter in suspension. Waste waters from domestic and industrial applications likewise require clarification before they may be discharged into rivers or other bodies of water. Many industrial aqueous fluids also require clarification before they can be successfully employed in commercial applications.

The removal of these turbidity-forming contaminants from water or other aqueous fluids presents an important problem and various methods have been developed for effecting their removal or reduction. Among these, coagulation procedures have been extensively employed, especially for the removal of turbidity and color bodies when these are present in water or aqueous solutions in suspended form as finely divided particles. Such coagulation procedures, at the same time, are also effective in removing a large proportion of the bacteria from water. A further application of the coagulation process resides in the softening of water, as, for example, may be carried out by the well-known lime-soda process.

Coagulation procedures, whether used for softening or for clarification of aqueous fluids, depend upon the use of compounds, designated as coagulants, which may be used alone or in various combinations. Such coagulant agents include, for example, alum or aluminum sulfate, sodium aluminate, ferrous or ferric salts, such as the chlorides or sulfates, lime, silicates, polyelectrolytes, both of natural origin and synthetic products, and colloidal clay of the bentonite type. These agents act by forming a flocculent precipitate in the aqueous system, the floc so formed then carrying down the impurities with it as it settles. The settled floc is then separated from the clarified aqueous liquid. It is desriable in a coagulation process that the floc settle relatively rapidly and effect a clear-cut separation from the liquid. It is of further importance that the floc be of such character that it can be handled, as in the course of its removal, without being disintegrated.

Accordingly, it is an object of this invention to provide a novel composition of matter effective as a coagulant in the clarification of turbid aqueous liquids.

It is a further object of the present invention to provide a novel and improved process for the removal of contaminants from water or other aqueous fluids by a coagulation procedure.

A further object of the invention resides in providing a method for clarifying water or other aqueous fluids involving the use of a novel coagulant composition.

In a pending application for patent, Ser. No. 470,581, filed July 8, 1965, a process for effecting the clarification and softening of water or aqueous solutions was described wherein the "matrix" surrounding pebble phosphate or phosphate rock served as a coagulant aid. The matrix was employed as an adjuvant in coagulant compositions in conjunction with other agents such as sodium metasilicate, sodium aluminate, or ferric chloride and a polyelectrolyte vegetable gum. The present invention is not concerned with the application of the above described "matrix" nor with the use of any polyelectrolyte vegetable gums in coagulant compositions. Instead, the present invention is predicated on the unexpected discovery that coagulant compositions with excellent clarifying properties may be prepared by mixing, in proper proportions and under suitable conditions, ball clay with sodium metasilicate and sodium aluminate. An alternate coagulant composition may be prepared by suitably mixing ball clay with sodium aluminate and with acidulated pyrophyllite.

Both ball clay and pyrophyllite have characteristics which are distinctly different from those of the bentonite clays and are not to be confused with such clays. Ball clay is the general term for those clays that possess good plasticity, strong bonding power, high refractoriness and which burn to a white or cream colored product. These clays are fine grained relatively pure hydrated aluminum silicate and usually are gray, tan or blue but may be nearly white or even black. They are used as bonding and plasticizing agents, or chief ingredients of whiteware, porcelains, stoneware, terracotta, glass refractories, graphite crucibles and porcelain enamels. (The Condensed Chemical Dictionary, 6th edition, edited by Arthur and Elizabeth Rose, Reinhold Publishing Co., New York, 1961, page 123.)

Grim (Applied Clay Mineralogy, McGraw-Hill Co., Inc., 1962) notes that ball clays are white burning, highly plastic and easily dispersible. Such clays are composed mostly of extremely fine grained and relatively poorly organized kaolinite. Some ball clays also contain small amounts of illite and/or small amounts of montmorillonite, which may add to their desired properties. Also, many ball clays contain a small but appreciable amount of organic material, which appears also to enhance their desired properties. Clays with properties required of ball clays are not very widely distributed throughout the world. They are extensively produced in western Kentucky and Tennessee, and Mississippi in the United States from sedimentary deposits of the Upper Cretaceous and Lower Tertiary ages. (Page 132.)

Prophyllite (agalmatolite) $Al_2SiO_4O_{10}(OH)$ is a natural hydrous aluminum silicate found in metamorphic rocks. It may be colored white, green, gray or brown and may possess a pearly to greasy luster. It has good micaceous cleavage. Specific gravity is given a 2.8–2.9 and hardness as 1–2. The mineral, which is found in North Carolina, California, Newfoundland and Japan, is similar to talc for which it is sometimes used as a substitute. Other uses include application in ceramics, insecticides and slate pencils. (The Condensed Chemical Dictionary, page 960.)

Within the scope of the present invention it is contemplated that coagulant compositions of varying composition and properties, such as differences in pH value, may be prepared from the above noted ingredients. Broadly, from 20 to 125 parts of ball clay may be used with 5 to 60 parts of anhydrous sodium metasilicate and 10 to 190 parts of sodium aluminate, all parts being expressed as parts by weight. Such variations are desirable in order to achieve optimum results in specific applications, depending upon the nature of the impurities present and the chemical and physical characteristics of the aqueous liquid to be treated, as well as the type of equipment available. All of the compositions within the scope of the invention are effective in producing rapid settling flocs and perform efficiently and economically in removing turbidity from water or other aqueous fluids.

Coagulant compositions in accordance with the present invention are disclosed in the following specific examples, all proportions of ingredients being expressed as parts by weight.

Example I.—Low pH composition

| | Parts |
|---|---|
| Ball clay | 55 |
| Anhydrous sodium metasilicate | 20 |
| Sodium aluminate | 25 |

In order to adjust the above composition to the desired pH range of 7 to 8, the following procedure is carried out: A series of preliminary mixes is prepared based upon a fixed amount of ball clay with varying amounts of an acidic salt. The requisite quantities of anhydrous sodium metasilicate and sodium aluminate are added to these premixes and they are made up into 1% solutions in order to determine how much of said acid salt is required so that the final complete mixture has a pH in the range 7 to 8, preferably 7.5. Based on the findings of these preliminary tests, a standard formulation is developed designating the quantity of acid salt to be added per unit weight of mix.

In preparing the complete composition, the same procedure is followed; the ball clay is first mixed with the predetermined amount of acid salt. To this mixture the sodium metasilicate and sodium aluminate are added and mixed therewith to form the composition of the invention. The above composition is highly effective in clarifying turbid aqueous liquids and may be utilized at relatively low pH values.

It is understood that the specific quantities of ingredients disclosed in the above example are not limiting. A preferred range for this low pH composition comprises from 30 to 70 parts ball clay, from 5 to 40 parts anhydrous sodium metasilicate and from 15 to 50 parts sodium aluminate. The choice of acid salt is not critical nor is the above described procedure for adjusting the pH of the composition to be regarded as limiting. Suitable acid salts are, for example, magnesium sulfate, ferrous or ferric sulfates, manganese chloride, aluminum chloride or aluminum sulfate, or combinations of these salts.

In an alternate procedure for preparing the low pH coagulant composition the ball clay may be first acidulated with an acid such as sulfuric acid, hydrochloric acid or nitric acid, or combinations of such acids. This treatment serves to liberate aluminum from the clay forming an aluminum salt of the acid employed. The acidulated clay is then partially neutralized with soda ash, for example, to a pH of 4 to 5. Final adjustment of the complete compositon to the desired range of pH 7 to 8 is then made as described above, utilizing an acidic salt and adding the requisite amounts of anhydrous sodium metasilicate and sodium aluminate.

Example II.—High pH composition

| | Parts |
|---|---|
| Ball clay | 100 |
| Anhydrous sodium metasilicate | 30 |
| Sodium aluminate | 180 |

A dry mixture is made of the above ingredients. The composition has a pH value in excess of pH 11. Here again the specific amounts of ingredients disclosed are not to be regarded as limiting. A preferred range of ingredients for the high pH coagulant composition comprises 80 to 125 parts ball clay, from 15 to 60 parts anhydrous sodium metasilicate and from 25 to 180 parts sodium aluminate, all expressed as parts by weight.

Various modifications of the above described compositions and methods of preparing the same may be carried out and are contemplated within the scope of the present invention. Thus, in place of the anhydrous sodium metasilicate other alkali metal silicates may be used. Likewise, silicates having water of crystallization or even liquid silicates may be employed, proper adjustment being made to yield the desired amount of silicate on a dry basis.

A further modification of the coagulant composition may be effected by substituting an acidulated pyrophyllite for the sodium metasilicate. The purpose of acidulating the pyrophyllite is to liberate or free the alumina contained therein, leaving a residue of silica gel. The pyrophyllite may be utilized in either the low pH composition or the high pH mix. When it is used in the low pH coagulant composition it may be brought to a pH value of about pH 4, from which point the entire mix is adjusted to the desired range of pH 7 to 8, in the manner as described above. When employed in a high pH coagulant composition the pH value of the pyrophyllite is elevated to approximately 8 to 9.

Compositions of the above types are highly effective coagulating agents for the removal of turbidity from water or other aqueous liquids or solutions. Relatively small quantities of the compositions are required to form adequate fast-setting flocs, the exact amounts depending upon the nature and extent of the turbidity-forming contaminants and the characteristics of the liquid being treated. Clarification of turbid aqueous fluids with the coagulants of the invention is both an efficient and economical process.

In utilizing the compositions of the invention, they may be added to the turbid aqueous solution undergoing clarification either in the form of a dry powdered mixture or as a slurry prepared with a relatively small quantity of water.

It should be understood that various changes and modifications may be made within the scope of the applied claims, without departing from the spirit of the invention.

What is claimed is:

1. A coagulant composition for clarifying turbid aqueous liquids consisting essentially of a mixture of from 20 to 125 parts of ball clay, from 5 to 60 parts of anhydrous sodium metasilicate and from 10 to 190 parts of sodium aluminate, all parts being expressed as parts by weight.

2. A coagulant composition for clarifying turbid aqueous liquids consisting essentially of a mixture of from 30 to 70 parts ball clay, from 5 to 40 parts anhydrous sodium metasilicate and from 15 to 50 parts sodium aluminate, all parts being expressed as parts by weight.

3. A coagulant composition for clarifying turbid aqueous liquids consisting essentially of a mixture of 55 parts ball clay, 20 parts anhydrous sodium metasilicate and 25 parts sodium aluminate, all parts being expressed as parts by weight.

4. A coagulant composition for treating turbid aqueous liquids consisting essentially of a mixture of from 80 to 125 parts ball clay, from 15 to 60 parts anhydrous sodium metasilicate and from 25 to 180 parts sodium aluminate, all parts being expressed as parts by weight, said mixture having a pH value in excess of pH 11.

5. A coagulant composition for treating turbid aqueous liquids consisting essentially of a mixture of 100 parts ball clay, 30 parts anhydrous sodium metasilicate and 180 parts sodium aluminate, all parts being expressed as parts by weight, said mixture having a pH value in excess of pH 11.

6. A coagulant composition for treating turbid aqueous liquids consisting essentially of a mixture of from 20 to 125 parts ball clay, from 5 to 60 parts of acidulated pyrophyllite and from 10 to 190 parts sodium aluminate, all parts being expressed as parts by weight.

7. A coagulant composition for treating turbid aqueous liquids consisting essentially of a mixture of from 30 to 70 parts ball clay, from 5 to 40 parts acidulated pyrophyllite and from 15 to 50 parts sodium aluminate, all parts being expressed as parts by weight.

8. A coagulant composition for treating turbid aqueous liquids consisting essentially of a mixture of from 80 to 125 parts ball clay, from 15 to 60 parts acidulated pyrophyllite and from 25 to 180 parts sodium aluminate, said mixture having a pH value in excess of pH 11.

9. In the process of clarifying turbid aqueous liquids, the step which consists essentially of adding thereto a small but effective amount of a coagulant aid comprising from 20 to 125 parts ball clay, from 5 to 60 parts anhydrous sodium metasilicate and from 10 to 190 parts sodium aluminate, all parts being expressed as parts by weight, and then separating the floc so formed from the liquid so treated.

10. In the process of clarifying turbid aqueous liquids, the step which consists essentially of adding thereto a small but effective amount of the composition of claim 2 and separating the floc formed from the liquid so treated.

11. In the process of clarifying turbid aqueous liquids, the step which consists essentially of adding thereto a small but effective amount of the composition of claim 3 and separating the floc formed from the liquid so treated.

12. In the process of clarifying turbid aqueous liquids, the step which consists essentially of adding thereto a small but effective amount of the composition of claim 4 and separating the floc formed from the liquid so treated.

13. In the process of clarifying turbid aqueous liquids, the step which consists essentially of adding thereto a small but effective amount of the composition of claim 5 and separating the floc produced from the liquid so treated.

14. In the process of clarifying turbid aqueous liquids, the step which consists essentially of adding thereto a small but effective amount of a coagulant composition comprising a mixture of from 20 to 125 parts ball clay, from 5 to 60 parts of acidulated pyrophyllite from 10 to 190 parts of sodium aluminate, all parts being expressed as parts by weight, and separating the floc produced from the liquid so treated.

15. In the process of clarifying turbid aqueous liquids, the step which consists essentially of adding thereto a small but effective amount of the composition of claim 7 and separating the floc formed from the liquid so treated.

16. In the process of clarifying turbid aqueous liquids, the step which consists essentially of adding thereto a small but effective amount of the composition of claim 8 and separating the floc produced from the liquid so treated.

17. The composition of claim 1 wherein the mixture is adjusted to a pH of between 7 and 8 by forming a slurry thereof with a small amount of water and adding to said slurry a member selected from the group consisting of inorganic acids, inorganic acid salts and mixtures thereof.

18. The composition of claim 6 wherein the mixture is adjusted to a pH of between 7 and 8 by forming a slurry thereof with a small amount of water and adding to said slurry a member selected from the group consisting of inorganic acids, inorganic acid salts and mixtures thereof.

References Cited

UNITED STATES PATENTS

| 2,217,466 | 10/1940 | Bayliss | 252—175 |
| 2,241,641 | 5/1941 | Magill | 252—175 |
| 2,284,827 | 6/1942 | Lindsay et al. | 252—175 |
| 2,362,022 | 11/1944 | Olin | 252—175 |
| 3,130,167 | 4/1964 | Green | 252—181 |

FOREIGN PATENTS 434,663    9/1935    Great Britain.

LEON D. ROSDOL, *Primary Examiner.*

W. SCHULZ, *Assistant Examiner.*

U.S. Cl. X.R.

252—79.4, 135, 138; 148—6.15, 6.16; 156—21